(12) United States Patent
Zeibig et al.

(10) Patent No.: US 6,637,317 B1
(45) Date of Patent: Oct. 28, 2003

(54) PISTON FOR A HYDRAULIC PRESSURE CHAMBER

(75) Inventors: Uwe Zeibig, Achern (DE); Uwe Hendrich, Steinbach (DE); Rolf Weiler, Eppstein (DE); Peter Schneider, Rüsselsheim (DE)

(73) Assignees: Continental Teves AG & Co., OHG, Frankfurt (DE); Sander KG, Renchen-Ulm (DE)

( * ) Notice: Subject to any disclaimer, the term of this patent is extended or adjusted under 35 U.S.C. 154(b) by 0 days.

(21) Appl. No.: 10/019,979

(22) PCT Filed: Jun. 30, 2000

(86) PCT No.: PCT/EP00/06097
§ 371 (c)(1),
(2), (4) Date: Jun. 21, 2002

(87) PCT Pub. No.: WO01/02745
PCT Pub. Date: Jan. 11, 2001

(30) Foreign Application Priority Data

Jul. 2, 1999 (DE) .......................... 199 30 457
Aug. 24, 1999 (DE) .......................... 199 39 873

(51) Int. Cl.⁷ ............................ F16D 65/16; F16J 1/00
(52) U.S. Cl. .......................................... 92/208; 92/129
(58) Field of Search .................... 92/129, 172, 208, 92/239

(56) References Cited

U.S. PATENT DOCUMENTS

| | | | | |
|---|---|---|---|---|
| 4,055,238 A | * | 10/1977 | Haraikawa et al. | ........... 92/129 |
| 4,193,179 A | * | 3/1980 | Confer et al. | ................. 92/208 |
| 5,105,917 A | | 4/1992 | Sporzynski et al. | |
| 5,988,044 A | * | 11/1999 | Meyer | .......................... 92/176 |

FOREIGN PATENT DOCUMENTS

| | | |
|---|---|---|
| DE | 1 962 323 | 6/1967 |
| DE | 1 750 662 | 2/1971 |
| DE | 1 953 541 | 5/1971 |
| DE | 32 31 135 | 2/1984 |
| DE | 88 00 376 | 4/1988 |
| DE | 40 03 731 | 8/1991 |
| DE | 43 35 327 | 4/1995 |
| DE | 196 51 842 | 6/1998 |
| DE | 298 15 358 | 5/1999 |
| DE | 198 20 902 | 11/1999 |
| EP | 0 304 103 | 2/1989 |

OTHER PUBLICATIONS

'Konstruktions–Atlas', Werkstoff– und verfahrensgerecht konstruieren, by Karl–Heinz Bode 1988.
Search Report of the German Patent Office for Appln 19939873.9.

* cited by examiner

Primary Examiner—Edward K. Look
Assistant Examiner—Igor Kershteyn
(74) Attorney, Agent, or Firm—Rader, Fishman & Grauer PLLC

(57) ABSTRACT

The present invention relates to a piston for a hydraulic pressure chamber, especially a piston bore of a spot-type disc brake, wherein the piston is configured as a bowl-shaped hollow cylinder that is open on one side and made from a metal blank of a constant wall thickness in a forming operation. The piston has a bottom to which hydraulic pressure is applicable and a piston wall which, at its open end, passes over into a rim that has a circular abutment surface. Especially in view of conventional cast pistons, an object of the present invention is related to providing a piston which permits being manufactured by means of a simple forming operation, which can be configured as light as possible and with low expenditure in material, without limiting the stress capacity of the piston. This object is achieved in that the piston includes at least one portion with a fold shaping, where the thickness of the piston wall or of the bottom is increased compared to the thickness of the remaining piston wall or of the bottom and corresponds to several times the wall thickness of the metal blank. As a result, the piston is favorably reinforced only in areas of high stress.

6 Claims, 1 Drawing Sheet

PISTON FOR A HYDRAULIC PRESSURE CHAMBER

TECHNICAL FIELD

The present invention relates to a piston for a hydraulic pressure chamber, especially a piston bore of a hydraulic brake. The Piston is configured as a bowl-shaped hollow cylinder that is open on one side and made from a metal blank of a constant wall thickness in a forming operation.

BACKGROUND OF THE INVENTION

DE40 03 731 A1 discloses a cold-worked piston for a hydraulically operating brake which is preferably made in a deepdrawing process, and which is comparatively thin-walled and hence, has a lighter design compared to the cast pistons known from the state of the art. In order to protect the walls of the piston against deformation when subjected to force, the prior art piston has a curved bottom and a groove that is rolled up at its circumference, both reinforcing the shape of the piston. Due to the thin-walled design of steel pistons of this type compared to pistons manufactured from gray cast iron, it is achieved that also the frontal abutment surface of the bowl rim at the open piston end in application against the brake lining is considerably smaller compared to cast pistons. The result is a high surface pressure, which is not desirable. In addition, it has shown that a piston of this type, especially with a thin-walled configuration, suffers from inadmissibly great deformations under stress.

BRIEF SUMMARY OF THE INVENTION

Based on the known state of the art, an object of the present invention is to provide a piston which permits being manufactured by means of a simple forming operation, which can be configured as light as possible and with low expenditure in material, without limiting the stress capacity of the piston. This object is achieved by a piston embodying the features of claim 1. The principle of the present invention involves making the piston from a metal blank which is as thin-walled as possible and has a constant wall thickness, especially in the shape of a ronde, by a non-cutting forming process, especially a cold forming process, in order to reduce weight compared to cast pistons known in the art. To increase the stress capacity of the piston, the piston is reinforced at the endangered portions by taking forming measures at the metal blank. In a very favorable manner, the piston may include folded portions in the areas which are subjected to particularly high stress, with the result that the thickness of the piston wall or of the piston bottom is increased compared to the thickness of the remaining piston wall or of the bottom. All in all, the thickness in these reinforced portions corresponds to several times the wall thickness of the metal blank. Compared to prior art piston designs, a considerable weight reduction is thereby achieved, and the necessary piston strength and piston rigidity is maintained.

In the capacity of areas which are highly stressed when subjected to force, above all the rim at the open end of the bowl-shaped piston and the transition area between the piston wall and the piston bottom are furnished with circumferential fold shapings that extend about the piston axis to reinforce these portions. Shaping a fold at the rim along with preferably doubling the wall thickness of the metal blank additionally achieves an increase in the circular abutment surface provided at the rim.

It is especially advantageous that the new piston can be employed in a hydraulically operating brake. The bottom of brake pistons of this type is usually exposed to the hydraulic pressure, and the frontal abutment surface at the open piston end bears against a brake lining. After the non-cutting forming process of the ronde-shaped metal blank, the piston rim at its end surface preferably undergoes a machining operation in order to enhance the accuracy of measurement of the smooth abutment surface. Due to the fold shaping, the abutment surface is increased compared to the remaining cross-sectional surface of the thin piston wall and, thus, reduces the surface pressure on the brake lining caused by the piston.

In a preferred aspect of the present invention, the piston wall of the piston has a radial step which, along with the folded portion at the piston rim, forms a circumferential groove about the piston axis on the outward peripheral surface of the piston. When the piston is installed into the hydraulic brake, a groove of this type may be used in particular to receive a ring seal or any other sealing element. This eliminates the need for a metal cutting process on the piston to provide the groove as done with previously known cast pistons. In addition, the circumferential radial step on the inner surface of the piston wall is used as a supporting surface for a lining holding spring which extends into the piston interior and may backgrip the step.

In another favorable embodiment of the piston, the piston bottom has a curved design, with the outward surface of the bottom exhibiting a convex curvature. This permits designing the piston with a very small thickness of the wall, as the stress capacity requirement may be, and hence with a minimum expenditure in material, while encountering only minor elastic deformations under stress.

DETAILED DESCRIPTION OF THE PREFERRED EMBODIMENTS

Figure 1:
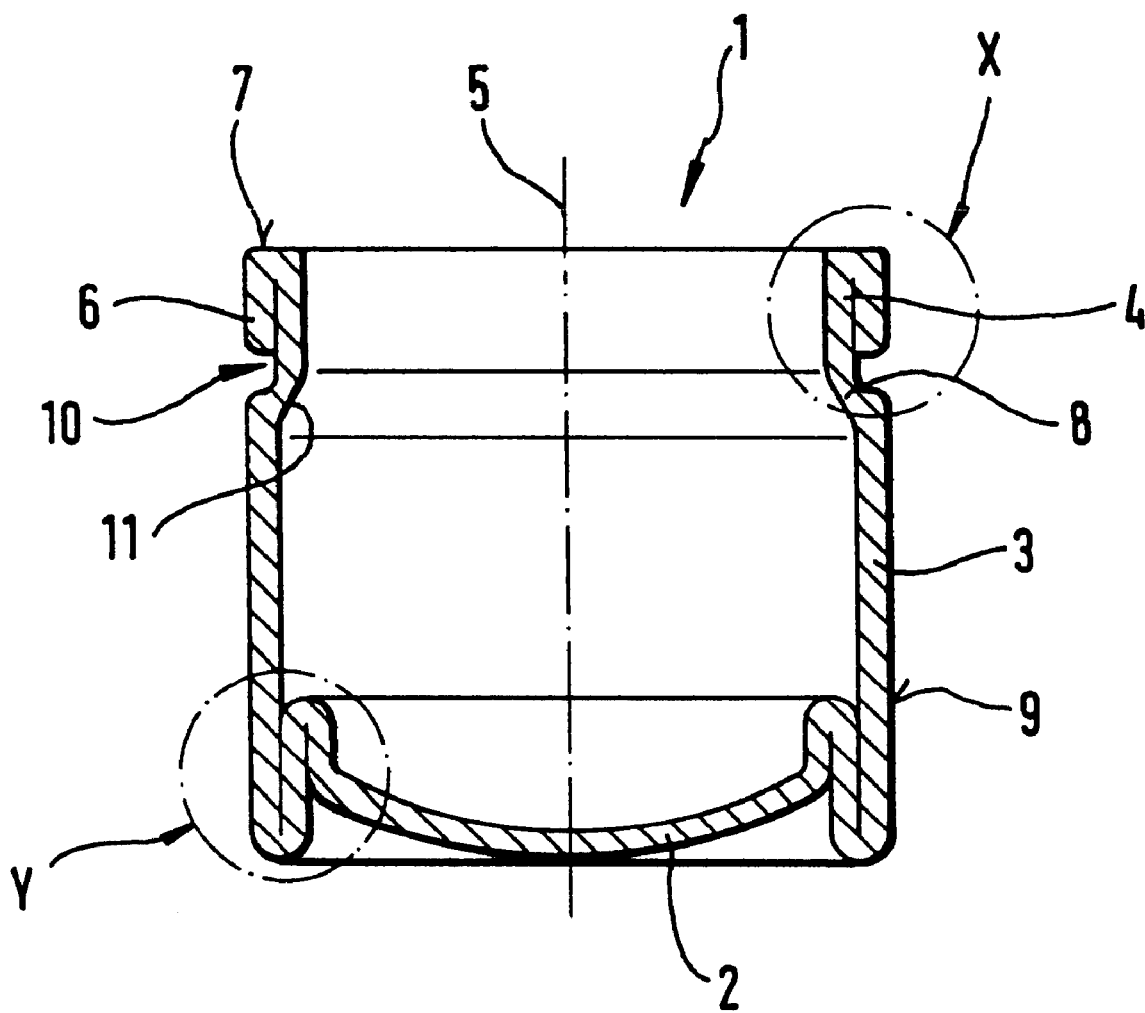
FIG. 1 is a longitudinal cross-sectional view of a piston of the present invention.

FIG. 1 shows a longitudinal cross-section taken through a piston 1 for a hydraulic brake, especially a spot-type disc brake for automotive vehicles, which piston is manufactured from a metal blank in a forming process, preferably in a non-cutting cold forming process. The metal blank advantageously has the shape of a ronde of a constant wall thickness. The shaping of the piston 1, which is basically configured as a cylindrical bowl that is open on one side, is preferably carried out by a deepdrawing process or a forming operation similar to deepdrawing. Piston 1 has an outwards curved piston bottom 2 which is this way protected against deformations and, hence, is appropriate for application with hydraulic pressure, in particular within an automotive vehicle brake, and a piston wall 3 which passes over into a rim 4 at the open end of the bowl-shaped piston 1.

At its rim 4 at the open piston end, the piston 1 has a circumferential portion 6 which is folded by 180° with respect to the piston axis 5. Due to the portion X which is shaped with a fold, the rim 4 has a material strength which is increased compared to the remaining piston wall or piston bottom thickness and, when folded only one time, corresponds to twice the wall thickness of the metal blank. A circular abutment surface 7 for a brake lining (not shown) is provided at rim 4. Due to the fold shaping at rim 4, the abutment surface 7 is larger than the remaining cross-sectional surface of the piston wall 3. The size of this abutment surface 7 basically corresponds to the size of the abutment surface which a piston that is manufactured in a gray casting process typically has. This means that compared to a corresponding cast piston, the same or, in the event of multiple fold shapings, even a reduced surface pressure at the brake lining is achieved for the piston configured according to the present invention, despite its thin-walled shaping, when subjected to hydraulic pressure. Undesirable damages to possibly used damping elements at the brake lining may, hence, be avoided as a result of the low surface pressure that is due to the large abutment surface 7.

In the vicinity of the rim 4, the piston wall 3 includes a circumferential radial step 8 about the piston axis 5, which step is equally formed in the piston wall by a non-cutting cold forming process, e.g. by a rolling operation. A circumferential groove 10 is designed on the outward peripheral surface 9 of the piston wall 3 by the step 8 and the folded portion 6 at the rim 4, while a shoulder 11 is formed on the radial inner surface of the piston wall 3. When the piston 1 is mounted in a hydraulic brake (not shown), the groove 10 may be used to accommodate a ring seal or any other sealing element. Shoulder 11 practically provides a simple possibility of supporting or anchoring a lining holding spring (which is neither shown) which is attached on the brake lining side and can backgrip the shoulder 11.

In general, the piston is induced to adopt its bowl shape, open on one side, during its manufacturing process by way of a non-cutting cold forming process, especially by deep-drawing a ronde-shaped metal blank of a constant wall thickness. It is principally possible to use beside the cold forming process also other suitable non-cutting forming processes. Subsequently, the portions X and Y provided with fold shapings and the step 8 are formed in a non-cutting fashion into the piston wall 3 or the piston bottom 2, preferably in a combination of a forming operation with a rolling process. Similarly, other, corresponding cold forming processes may of course be employed as well. Another advantage of this cold forming process can be seen in the cold work-hardening in the formed piston wall portions. Due to the geometric design (fold shaping) and cold work-hardening of the piston material, the required strength and rigidity of the piston is reached in spite of the material being stressed by the deformation during the manufacturing process. This applies especially to the portions X and Y provided with folds. Thereafter, the end surface of the rim 4 on the side of the brake lining is finished, preferably in a metal-cutting way, so that a smooth abutment surface 7 is achieved on which the brake lining can flatly abut. Optionally, the groove 10, too, may undergo a machining operation in order to safeguard its accuracy of measurement.

Compared to a cast piston, further advantages such as a weight reduction by more than 100 g per piston will be achieved, because the cold formed piston may be configured to have a very thin wall, in conformity with stress conditions. In addition, sink holes and porosity problems as encountered with cast pistons are prevented in cold formed pistons. Steel and stainless steel materials should be used as preferred piston materials for the novel piston. Depending on the case of application, the use of further metallic materials such as base metals or light alloys (aluminum) is also feasible.

What is claimed is:

1. Piston for a hydraulic pressure chamber, comprising:
    a bowl-shaped hollow cylinder that is open on one side, including a bottom and a piston wall which, at its open end, passes over into a rim that has a circular abutment surface, wherein the piston includes at least one folded portion where the thickness of the piston wall or of the bottom is increased compared to the thickness of the remaining piston wall or of the bottom and corresponds to several times the wall thickness of the metal blank, further including a circumferential folded portion about the piston axis at the rim at the open piston end that amounts to several times the wall thickness of the metal blank.

2. Piston as claimed in claim 1, wherein the rim is smoothened at least at its abutment surface by a machining operation.

3. Piston for a hydraulic pressure chamber which is configured as a bowl-shaped hollow cylinder that is open on one side and made from a metal blank of a constant wall thickness in a forming operation, including a bottom to which hydraulic pressure is applicable and a piston wall which, at its open end, passes over into a rim that has a circular abutment surface, wherein the piston in its transition area between the bottom and the piston wall includes a circumferential folded portion about the piston axis where the thickness of the piston wall or of the bottom is increased compared to the thickness of the remaining piston wall or of the bottom and corresponds to several times the wall thickness of the metal blank, comprising a curved shaped bottom with the outward surface of the bottom having a convex curvature so that the folded portion amounts to three times the wall thickness of the metal blank.

4. Piston as claimed in claim 3, wherein the piston wall includes a radial, inwards shaped step.

5. Piston as claimed in claim 3, wherein the piston wall at an outward periphery includes a circumferential groove about the piston axis, which groove is limited by the step and by a folded portion at the rim.

6. Piston as claimed in claim 3, wherein the piston is designed as a brake piston for a hydraulic brake.

* * * * *